United States Patent
Tamai et al.

(10) Patent No.: US 11,054,001 B1
(45) Date of Patent: Jul. 6, 2021

(54) ELECTRIC DRIVE UNIT WITH DOUBLE HELICAL GEAR

(71) Applicant: GM Global Technology Operations LLC, Detroit, MI (US)

(72) Inventors: Goro Tamai, Bloomfield Hills, MI (US); Shawn H. Swales, Canton, MI (US); Mohammad Hotait, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/929,860

(22) Filed: Jul. 15, 2020

(51) Int. Cl.
| | |
|---|---|
| *F16H 37/08* | (2006.01) |
| *F16H 1/30* | (2006.01) |
| *F16H 1/32* | (2006.01) |
| *F16H 57/08* | (2006.01) |

(52) U.S. Cl.
CPC ............... *F16H 1/30* (2013.01); *F16H 1/32* (2013.01); *F16H 57/082* (2013.01); *F16H 2001/327* (2013.01)

(58) Field of Classification Search
CPC . B60K 2001/001; F16H 37/08; F16H 37/082; F16H 2048/385; F16H 48/42
USPC ........................................................ 475/150
See application file for complete search history.

(56) References Cited

U.S. PATENT DOCUMENTS

| | | | | |
|---|---|---|---|---|
| 2,248,219 | A * | 7/1941 | Day ....................... | B63H 23/02 74/410 |
| 5,220,847 | A * | 6/1993 | Bien ..................... | F16H 57/023 105/55 |
| 8,870,697 | B2 * | 10/2014 | Sada ........................ | B60K 6/40 475/149 |
| 10,228,045 | B2 * | 3/2019 | Matsumoto ........... | F16H 55/566 |
| 10,683,910 | B2 * | 6/2020 | Matsumoto ............... | F16H 1/08 |
| 2009/0062058 | A1 * | 3/2009 | Kimes ....................... | F16H 1/28 475/344 |
| 2019/0309838 | A1 * | 10/2019 | Cooper ................... | F16H 48/08 |
| 2020/0108706 | A1 * | 4/2020 | Devreese ................ | F16H 37/08 |

* cited by examiner

*Primary Examiner* — Sherry L Estremsky (57) ABSTRACT

An electric drive unit includes an electric motor, a differential assembly, and a double-helical gearset positioned between and interconnecting the electric motor and the differential assembly and adapted to transfer rotational motion from the electric motor to the differential assembly, the double-helical gearset including a driving double-helical gear rotationally mounted onto a transfer shaft of the electric motor and including a right-hand helix, a left-hand helix and a gap extending circumferentially between the right-hand helix and the left-hand helix, and a driven double-helical gear rotationally mounted onto a housing of the differential assembly and including a right-hand helix, a left-hand helix and a gap extending circumferentially between the right-hand helix and the left-hand helix, and a park gear positioned within the gap between the right hand helix and the left hand helix of one of the driving double-helical gear and the driven double-helical gear, wherein one of the driving double-helical gear and the driven double-helical gear is axially moveable.

17 Claims, 7 Drawing Sheets

ELECTRIC DRIVE UNIT WITH DOUBLE HELICAL GEAR

INTRODUCTION

The present disclosure relates to an electric drive unit having a double-helical gear engagement between an electric motor and a differential assembly.

Gear mesh engagements are used to transfer rotational motion from one rotating body to another rotating body. In an electric drive unit often a gear mesh engagement is used to transfer rotational motion from an transfer shaft of an electric motor to a differential assembly. To reduce noise, vibration and harshness (NVH) concerns, helical gears may be used. Typically helical gears provide smoother and less noisy engagement than straight spur gears. However, the use of a helical gear poses other problems. A helical gear arrangement results in axial loading on the rotating components. The angled teeth of the helical gears transfer not only rotational motion, but also exert an axial force. To accommodate these axial forces, typically, the helix angle of the helical gears is limited, thereby reducing the axial forces exerted on the helical gears. Additionally, bearings used to rotatably support the rotating components can be designed to withstand and absorb the axial forces exerted by the helical gears, resulting in increased losses within the bearings.

Thus, while current electric drive units achieve their intended purpose, there is a need for a new and improved drive unit that uses a gear mesh engagement between the electric motor and the differential assembly that produces substantially no axial loads. No axial loads in the gear mesh engagement will allow the drive unit to be designed with smaller bearings that are not required to withstand axial loads, and allows the helix angle of the helical gears to be increased, thereby improving NVH concerns and reducing losses in the electric drive unit.

SUMMARY

According to several aspects of the present disclosure, an electric drive unit includes an electric motor, a differential assembly, and a double-helical gearset positioned between and interconnecting the electric motor and the differential assembly and adapted to transfer rotational motion from the electric motor to the differential assembly.

According to another aspect, the electric motor includes a stator and a rotor, and is adapted to allow axial movement of the rotor relative to the stator to allow self-centering of the double-helical gearset, and the axial position of the rotor relative to the stator is established by the double-helical gearset.

According to another aspect, the double-helical gearset includes a driving double-helical gear rotationally mounted onto an transfer shaft of the electric motor, the driving double-helical gear including a right-hand helix, a left-hand helix and a gap extending circumferentially around the driving double-helical gear between the right-hand helix and the left-hand helix and a driven double-helical gear rotationally mounted onto a housing of the differential assembly, the driven double-helical gear including a right-hand helix, a left-hand helix and a gap extending circumferentially around the driven double-helical gear between the right-hand helix and the left-hand helix, the driving double-helical gear in engagement with the driven double-helical gear.

According to another aspect, one of the driving double-helical gear and the driven double-helical gear includes a park gear positioned within the gap between the right-hand helix and the left-hand helix.

According to another aspect, one of the driving double-helical gear and the driven double-helical gear is axially moveable relative to the other one of the driving double-helical gear and the driven double-helical gear.

According to another aspect, the electric motor includes a stator, a rotor, a rotor shaft and a planetary gearset all mounted co-axially with the transfer shaft, the planetary gearset interconnecting the rotor shaft and the transfer shaft to transfer rotational motion from the rotor shaft to the transfer shaft.

According to another aspect, the rotor shaft is rotatably supported on the transfer shaft by a radially nested bearing.

According to another aspect, the planetary gearset includes a sun gear, a ring gear, a carrier and a plurality of pinion gears rotatably supported on the carrier, each of the sun gear, the ring gear and the plurality of pinion gears is a double-helical gear.

According to another aspect, the planetary gearset is a ring-less stepped-pinion planetary gearset.

According to another aspect, the planetary gearset includes a first sun gear, a second sun gear, a carrier, and a plurality of stepped pinion gears.

According to another aspect, the electric motor includes a stator, a rotor and a rotor shaft all mounted co-axially with the transfer shaft and the double-helical gearset comprises, a planetary gearset interconnecting the rotor shaft and the transfer shaft to transfer rotational motion from the rotor shaft to the transfer shaft.

According to another aspect, the planetary gearset includes a sun gear, a ring gear, a carrier and a plurality of pinion gears rotatably supported on the carrier, further wherein each of the sun gear, the ring gear and the plurality of pinion gears is a double-helical gear.

According to another aspect, the double-helical gearset includes a layshaft, a first double-helical gear pair adapted to transfer rotational motion from the electric motor to the layshaft and a second double-helical gear pair adapted to transfer rotational motion from the layshaft to the differential assembly.

According to another aspect, the first double-helical gearset includes a driving double-helical gear rotationally mounted onto a transfer shaft of the electric motor and a driven double-helical gear rotationally mounted onto the layshaft, and the second double-helical gearset includes a driving double-helical gear rotationally mounted onto the layshaft and a driven double helical gear rotationally mounted onto a housing of the differential assembly.

According to another aspect, each of the driving double-helical gears includes a right-hand helix, a left-hand helix and a gap extending circumferentially around the driving double-helical gear between the right-hand helix and the left-hand helix, and each of the driven double-helical gears includes a right-hand helix, a left-hand helix and a gap extending circumferentially around the driven double-helical gear between the right-hand helix and the left-hand helix.

According to another aspect, one of the driving double-helical gears and the driven double-helical gears includes a park gear positioned within the gap between the right-hand helix and the left-hand helix.

According to another aspect, only one of the driving double-helical gear mounted onto the transfer shaft of the electric motor, the layshaft and the driven double-helical gear mounted onto the housing of the differential assembly is axially fixed relative to the electric motor and the differential assembly.

According to several aspects of the present disclosure, an electric drive unit according to the present disclosure includes an electric motor, a differential assembly, and a double-helical gearset positioned between and interconnecting the electric motor and the differential assembly and adapted to transfer rotational motion from the electric motor to the differential assembly, the double-helical gearset including a driving double-helical gear rotationally mounted onto a transfer shaft of the electric motor and including a right-hand helix, a left-hand helix and a gap extending circumferentially around the driving double-helix gear between the right-hand helix and the left-hand helix, a driven double-helical gear rotationally mounted onto a housing of the differential assembly and including a right-hand helix, a left-hand helix and a gap extending circumferentially around the driven double-helical gear between the right-hand helix and the left-hand helix, and a park gear positioned within the gap between the right hand helix and the left hand helix of one of the driving double-helical gear and the driven double-helical gear, wherein one of the driving double-helical gear and the driven double-helical gear is axially moveable relative to the electric motor and the differential assembly.

According to another aspect, the electric motor includes a stator, a rotor, a rotor shaft and a planetary gearset all mounted co-axially with the transfer shaft, the planetary gearset interconnecting the rotor shaft and the transfer shaft to transfer rotational motion from the rotor shaft to the transfer shaft.

According to another aspect, the double-helical gear-set includes a layshaft, a first double-helical gear pair adapted to transfer rotational motion from the electric motor to the layshaft and including a driving double-helical gear rotationally mounted onto a transfer shaft of the electric motor and a driven double-helical gear rotationally mounted onto the layshaft, and a second double-helical gear pair adapted to transfer rotational motion from the layshaft to the differential assembly and including a driving double-helical gear rotationally mounted onto the layshaft and a driven double-helical gear rotationally mounted onto a housing of the differential assembly, wherein each of the driving double-helical gears and the driven double-helical gears includes a right-hand helix, a left-hand helix and a gap extending circumferentially therearound, one of the driving double-helical gears and the driven double-helical gears including a park gear positioned within the gap between the right-hand helix and the left-hand helix, and wherein only one of the driving double-helical gear mounted onto the transfer shaft of the electric motor, the layshaft and the driven double-helical gear mounted onto the housing of the differential assembly is axially fixed relative to the electric motor and the differential assembly.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
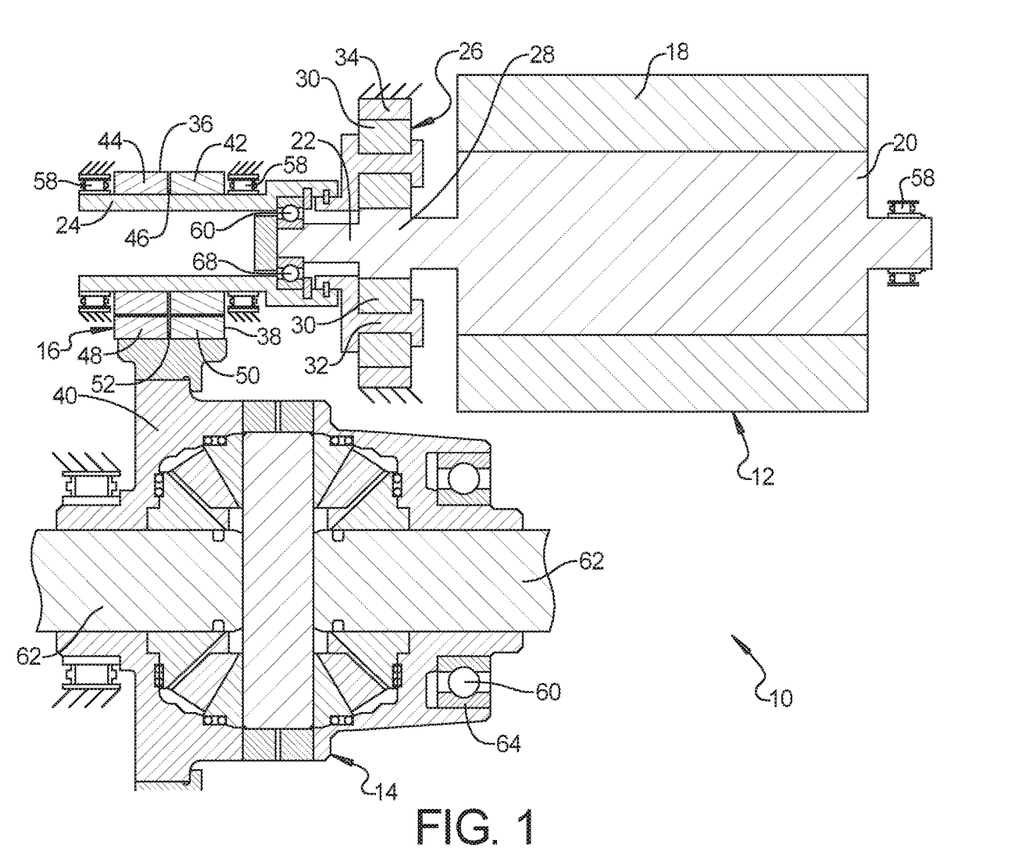
FIG. 1 is a side sectional view of an electric drive unit according to an exemplary embodiment.

Referring to FIG. 1, an electric drive unit 10 in accordance with the present disclosure includes an electric motor 12, a differential assembly 14 and a double-helical gearset 16 positioned between and interconnecting the electric motor 12 and the differential assembly 14. The double-helical gearset 16 is adapted to transfer rotational motion from the electric motor 12 to the differential assembly 14.

The electric motor 12 includes a stator 18, a rotor 20 and a rotor shaft 22. The stator 18, the rotor 20 and the rotor shaft 22 are all co-axial with one another about a central axis of the electric motor 12. The rotor 20 rotates within the stator 18 and spins the rotor shaft 22 when in operation. The rotor shaft 22 is interconnected with a transfer shaft 24. In the exemplary embodiment shown, a planetary gearset 26 is positioned between and interconnecting the rotor shaft 22 to the transfer shaft 24. The planetary gearset includes a sun gear 28 which is mounted onto or integrally formed with the rotor shaft 22 and a plurality of pinion gears 30 mounted onto a carrier 32. The carrier 32 is co-axial with the rotor shaft 22, and is rotationally connected to the transfer shaft 24. By way of a non-limiting example, the carrier 32 of the planetary gearset 26 has a spline engagement with the transfer shaft 24.

The planetary gearset 26 provides a gear reduction to reduce the rotational speed of the transfer shaft 24 from the rotational speed of the rotor shaft 22. In the exemplary embodiment shown in FIG. 1, an outer structure of the electric drive unit 10 acts as a fixed ring gear 34 for the planetary gearset 26 and includes a gear mesh engagement with the plurality of pinion gears 30.

The double-helical gearset 16 includes a driving double-helical gear 36 rotationally mounted onto the transfer shaft 24, and a driven double-helical gear 38 rotationally mounted onto a housing 40 of the differential assembly 14. The driving double-helical gear 36 is in engagement with the driven double-helical gear 38. When the electric motor 12 is in operation, rotation of the rotor shaft 22 is transferred through the planetary gearset 26 to the transfer shaft 24. The driving double-helical gear 36 rotates along with the transfer shaft 24 and rotates the driven double-helical gear 38 and the housing 40 of the differential assembly 14.

Figure 2:
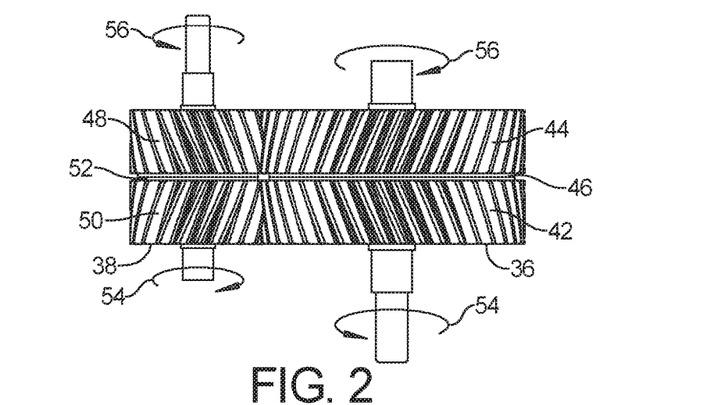
FIG. 2 is a perspective view illustrating the engagement of double-helical gears.

Referring to FIG. 2, a schematic view illustrates the engagement of the driving double-helical gear 36 and the driven double-helical gear 38. The driving double-helical gear 36 includes a right-hand helix 42, a left-hand helix 44 and a gap 46 extending circumferentially around the driving double-helical gear 36 between the right-hand helix 42 and the left-hand helix 44. Correspondingly, the driven double-helical gear 38 includes a right-hand helix 48, a left-hand helix 50 and a gap 52 extending circumferentially around the driven double-helical gear 38 between the right-hand helix 48 and the left-hand helix 50.

The gaps 46, 52 between the right-hand helix 42, 48 and the left-hand helix 44, 50 on each of the driving double-helical gear 36 and the driven double-helical gear 38 allows the driving and driven double-helical gears 36, 38 to self-center when they are in meshed engagement. When rotating, the right-hand helix 42, 48 of the driving and driven double-helical gears 36, 38 will exert an axial force pushing the driven double-helical gear 38 axially relative to the driving double-helical gear 36. Simultaneously, the left-hand helix 44, 50 of the driving and driven double-helical gears 36, 38 will exert a substantially equal axial force pushing the driven double-helical gear 38 axially relative to the driving double-helical gear 38, but in the opposite direction. These axial forces will substantially cancel each other, resulting in very little or no axial loading on the double-helical gearset 16 and passive self-alignment of the driving and driven double-helical gears 36, 38.

Due to manufacturing processes, all gears inherently have imperfections. By allowing the driving and driven double-helical gears 36, 38 to self-center, the double-helical gearset 16 establishes the center line of engagement between the driving and driven double-helical gears 36, 38. This allows the driving and driven double-helical gears 36, 38 to naturally find their best line of engagement, reducing undue wear and NVH issues.

Referring again to FIG. 2, the orientation of the driving and driven double-helical gears 36, 38 provides different features. In one instance, the driving and driven double-helical gears 36, 38 may be oriented such that when in operation the driving and driven double-helical gears 36, 38 rotate as indicated by arrows 54. When rotating in this direction, the right-hand and left-hand helix 42, 44, 48, 50 form a "V" shape that wedges through oil within the electric drive unit 10. Rotation in this direction reduces churn losses. Alternatively, the driving and driven double-helical gears 36, 38 may be oriented such that when in operation the driving and driven double-helical gears 36, 38 rotate as indicated by arrows 56. When rotating in this direction, the "V" shape formed by the right-hand and left-hand helix 42, 44, 48, 50 scoops oil and pumps the oil upward within the electric drive unit 10 to provide improved cooling and lubrication of components within the electric drive unit 10. The orientation of the driving and driven double-helical gears 36, 38 can be determined based on specific needs of the electric drive unit 10.

To allow the driving and driven double-helical gears 36, 38 to find their own center, at least one of the driving and driven double-helical gears 36, 38 must be axially floating. In an exemplary embodiment, one of the driving double-helical gear 36 and the driven double-helical gear 38 is axially moveable. Referring again to FIG. 1, the electric motor 12 and the transfer shaft 24 are supported by basic roller bearings 58 that provide radial support and allow rotation, but do not provide axial support, thereby allowing the electric motor 12 and the transfer shaft 24 to move axially relative to the differential assembly 14. The differential assembly 14 is supported by axial roller bearings 60 that provide radial support and allow rotation, as well as providing axial support to the differential assembly 14. The basic roller bearings 58 could be dual roller bearings (as shown) or ball bearings with "wide flat-section" osculation, i.e., a specially ground ball-bearing pair installed as an axially floating free-free assembly by ball-race design, not via axial sliding of the inner-race to shaft, or of the outer-race to housing.

The electric motor 12, the transfer shaft 24 and the driving double-helical gear 36 are axially floating relative to the differential assembly 14. Thus, the electric motor 12, the transfer shaft 24 and the driving double-helical gear 36 are allowed to move axially to allow the driving double-helical gear 36 to self-center relative to the driven double-helical gear 38. This configuration provides the benefit of isolating any plunge loads on half-shafts 62 of the differential assembly 14 directly to a differential case 64 without sending large axial loads through the double-helical gearset 16. It is also possible to use ball bearings to support the axially fixed differential that have a small flat-section formed within the osculation of the race to isolate the high frequency inertia reaction from the active double-helical gear mesh. The relatively large axial float within the transfer shaft 24 is required for the double-helical gear self-centering to correct for gear manufacturing imperfections. The small axial float of the differential, allowed by the small flat-section formed within the osculation of the race, isolates the double-helical gear from higher frequency axial shuttling force reactions.

Alternatively, the differential assembly 14 could be supported by basic roller bearings 58 and the electric motor 12 and transfer shaft 24 could be supported by axial roller bearings 60. In this instance, the electric motor 12, the transfer shaft 24 and the driving double-helical gear 36 are axially fixed, and the differential assembly 14 is axially floating. Thus, the differential assembly 14 and the driven double-helical gear 38 are allowed to move axially to allow the driven double-helical gear 38 to self-center relative to the driving double-helical gear 36.

Figure 3:
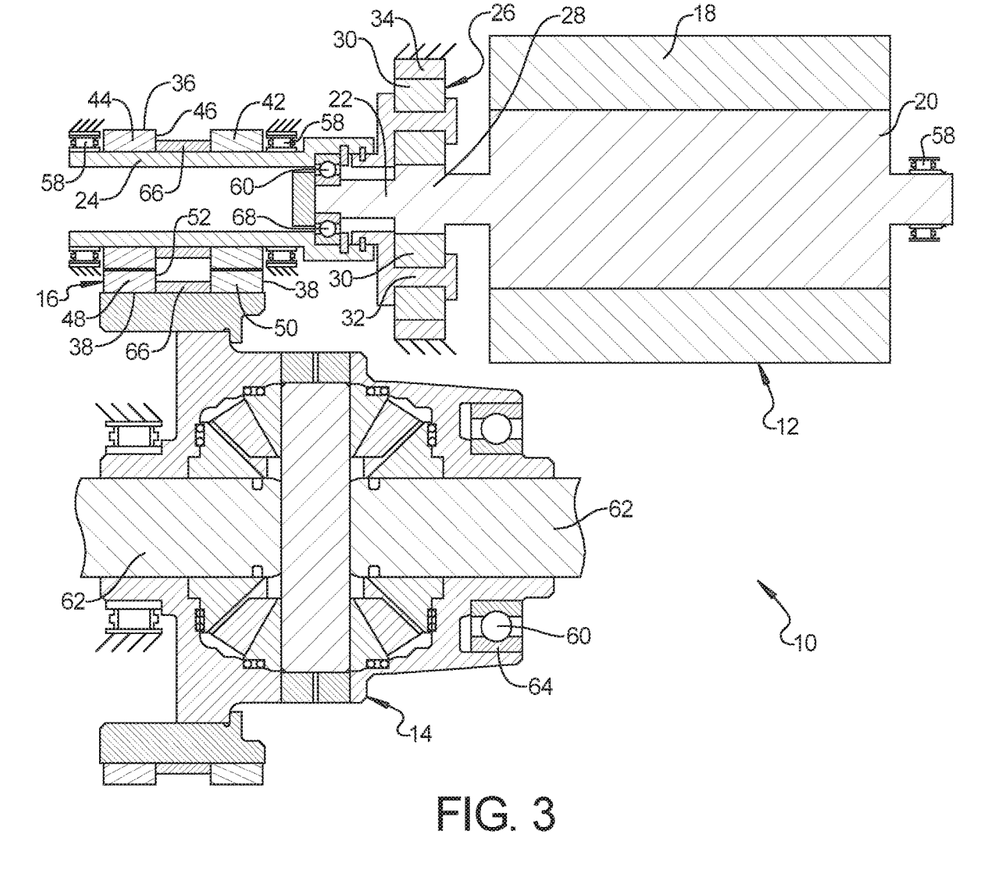
FIG. 3 is a side sectional view of an electric drive unit according to another exemplary embodiment.

Referring to FIG. 3, in an exemplary embodiment, one of the driving double-helix gear 36 and the driven double-helix gear 38 includes a park gear 66 positioned within the gap 46, 52 between the right-hand helix 42, 48 and the left-hand helix 44, 50. This park gear 66 is adapted to engage with a selectively actuated parking pawl to prevent rotation of the components within the electric drive unit 10. The park gear 66 may be positioned on either or both (as shown) of the driving double-helical gear 36 and the driven double-helical gear 38. The width of the gap 46, 52 between the right-hand helix 42, 48 and left-hand helix 44, 50 of the driving and driven double-helical gears 36, 38 is sufficient to accommodate the width of a parking pawl with enough clearance that the driving and driven double-helical gears 36, 38 can still axially float.

Referring again to FIG. 1 and FIG. 3, in an exemplary embodiment, the transfer shaft 24 is rotatably supported on the rotor shaft 22 by a radially nested bearing 68. The radial nested bearing 68 provides reduced relative speed and carries any axial thrust loads that may be present, keeping the rotor 20 axially positioned relative to the stator 18 and thus further reducing bearing losses. The nested bearing 68 should be located at a distance from the electric motor 12 that is more than approximately 50% of the length of the rotor 20 to reduce radial internal clearance (RIC) effect on air-gap uniformity.

Figure 4:
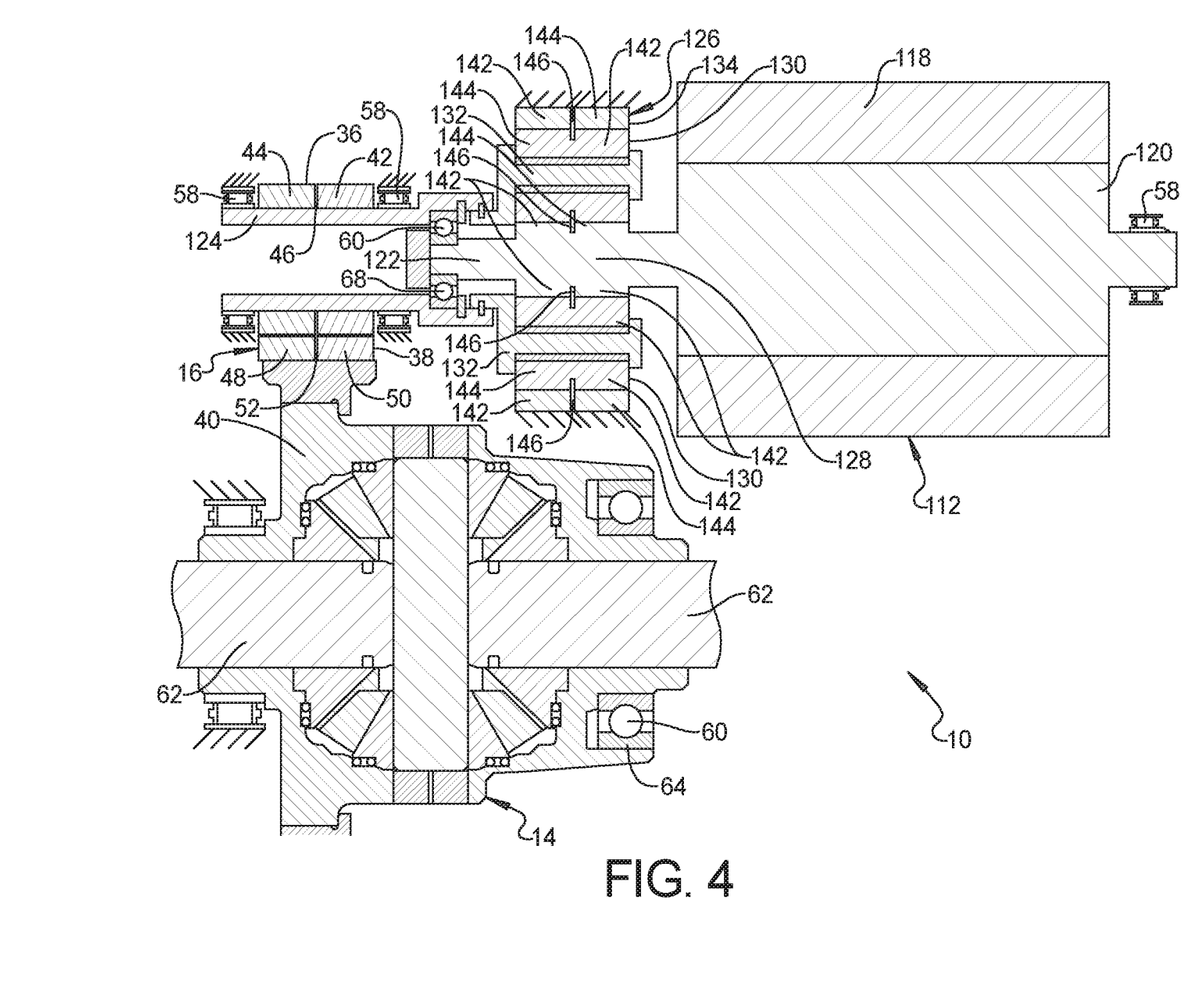
FIG. 4 is a side sectional view of an electric drive unit according to another exemplary embodiment.

Referring to FIG. 4, in another exemplary embodiment, an electric drive unit 110 includes a planetary gearset 126 is positioned between and interconnecting the rotor shaft 122 to the transfer shaft 124, similarly to that shown in FIG. 1. The planetary gearset 126 shown in FIG. 4, includes a double-helical sun gear 128 which is mounted onto or integrally formed within the rotor shaft 122 and a plurality of double-helical pinion gears 130 mounted onto a carrier 132. The carrier 132 is co-axial with the rotor shaft 122, and is rotationally connected to the transfer shaft 124.

The planetary gearset 126 provides a gear reduction to reduce the rotational speed of the transfer shaft 124 from the rotational speed of the rotor shaft 122. An outer structure of the electric drive unit 110 acts as a fixed double-helical ring gear 134 for the planetary gearset 126 and includes a gear mesh engagement with the plurality of double-helical pinion gears 130.

The double-helical sun gear 128, the double-helical ring gear 134, and each of the double-helical pinion gears 130 includes a right-hand helix 142, a left-hand helix 144 and a gap 146 extending circumferentially therearound, between the right-hand helix 142 and the left-hand helix 144. The gap 146 between the right-hand helix 142 and the left-hand helix 144 on each of the double-helical sun gear 128, the double-helical ring gear 134, and each of the double-helical pinion gears 130 allows the double-helical sun gear 128, the double-helical ring gear 134, and each of the double-helical pinion gears 130 to self-center when they are in meshed engagement. When rotating, the right-hand helix 142 will exert an axial force pushing axially in one direction. Simultaneously, the left-hand helix 144 will exert a substantially equal axial force pushing axially in the opposite direction. These axial forces will substantially cancel each other, resulting in very little or no axial loading on the pinion bearings 131 of the double-helical pinion gears 130. Additionally, the overturning moments imposed on the right-hand helix and left-hand helix of each of the pinion gears 130 cancels each other out before reaching the pinion bearings, therefore, reducing bearing losses. As shown in FIG. 4, each pinion gear 130 is a unitarily formed double-helical gear.

Alternatively, each of the pinion gears 130 could be replaced with a pair of pinion gears positioned side by side on a common shaft, such as an outer race for pinion needle roller bearings. The pair of pinion gears would have opposing right-hand and left-hand helix orientations, and would rotate synchronously, functioning the same as a single double-helical pinion bearing. Since the two pinions would be supported on a common shaft, overturning/tilting moments imposed on the right-hand of one pinion gear cancels out the overturning moments imposed on the left-hand helix of the adjacent pinion, preventing such forces from reaching the pinion needle roller bearings, therefore, reducing bearing losses.

The self-centering of the double-helical sun gear 128, the double-helical ring gear 134, and each of the double-helical pinion gears 130 also provides axial support to maintain the position of the rotor 120 relative to the stator 118. The electric motor 112 is adapted to allow axial movement of the rotor 120 relative to the stator 118 to accommodate self-centering of the double-helical gears 128, 130, 134. The axial position of the rotor 120 relative to the stator 118 is established by the double-helical gears 128, 130, 134. Once the double-helical gears 128, 130, 134 find their natural alignment, the engagement of the double-helical gears 128, 130, 134 will maintain the position of the rotor 120 relative to the stator 118. The axial overlap/underlap of the stator-to-rotor is such that the axial force vs. displacement curve has a "bathtub" shape, with a bottom that is wider that the axial tolerance stack-up of the double-helical gears 128, 130, 134. This avoids unbalanced axial magnetic forces on the double-helical gearset 116.

Figure 5A:
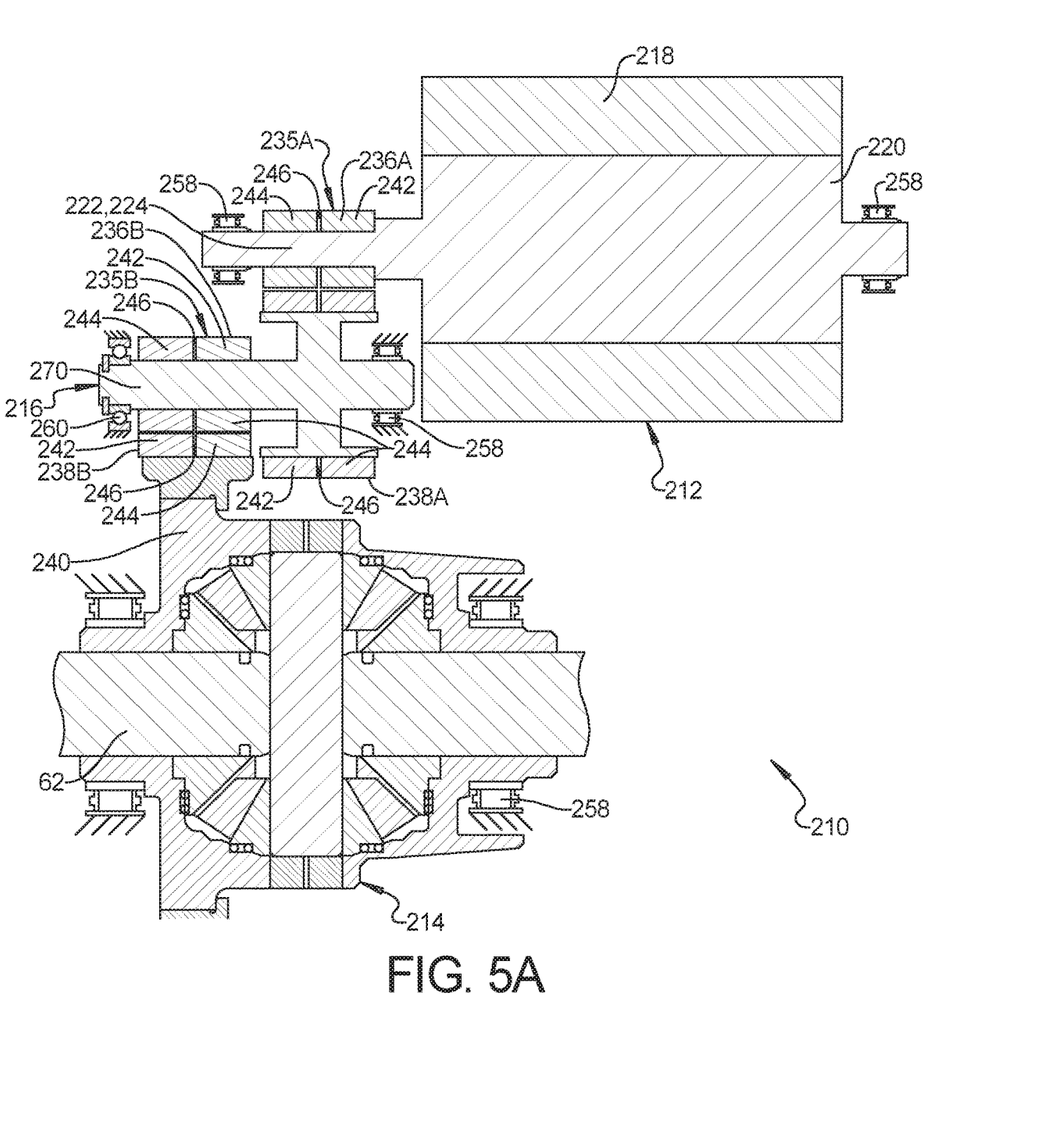
FIG. 5A is a side sectional view of an electric drive unit according to another exemplary embodiment.

Referring to FIG. 5A, in another exemplary embodiment, an electric drive unit 210 in accordance with the present disclosure includes an electric motor 212, a differential assembly 214 and a double-helical gearset 216 positioned between and interconnecting the electric motor 212 and the differential assembly 214. The double-helical gearset 216 is adapted to transfer rotational motion from the electric motor 212 to the differential assembly 214.

The electric motor 212 includes a stator 218, a rotor 220 and a rotor shaft 222. The stator 218, the rotor 220 and the rotor shaft 222 are all co-axial with one another about a central axis of the electric motor 212. The rotor 220 rotates within the stator 218 and spins the rotor shaft 222 when in operation. The rotor shaft 222 is interconnected with a transfer shaft 224.

The double-helical gearset 216 includes a layshaft 270, a first double-helical gear pair 235A and a second double-helical gear pair 235B. The first double-helical gear pair 235A is adapted to transfer rotational motion from the electric motor 212 to the layshaft 270 and the second double-helical gear pair 235B is adapted to transfer rotational motion from the layshaft 270 to the differential assembly 214.

The first double-helical gear pair 235A includes a driving double-helical gear 236A rotationally mounted onto the transfer shaft 224 of the electric motor 212 and a driven double-helical gear 238A rotationally mounted onto the layshaft 270. The second double-helical gear pair 235B includes a driving double-helical gear 236B rotationally mounted onto the layshaft 270 and a driven double-helical gear 238B rotationally mounted onto a housing 240 of the differential assembly 214.

As shown, the first double-helical gear pair 235A provides a speed reduction from the rotor shaft 222 to the layshaft 270. The driving double-helical gear 236A has fewer teeth than the driven double-helical gear 238A.

The driving double-helical gear 236A, 236B and the driven double-helical gear 238A, 238B of both the first and second double-helical gear pairs 235A, 235B each include a right-hand helix 242, a left-hand helix 244 and a gap 246 extending circumferentially therearound, between the right-hand helix 242 and the left-hand helix 244.

The gap 246 between the right-hand helix 242 and the left-hand helix 244 on each of the driving double-helical gears 236A, 236B and the driven double-helical gears 238A, 238B allows the driving and driven double-helical gears 236A, 236B, 238A, 238B to self-center when they are in meshed engagement. When rotating, the right-hand helix 242 of the driving double-helical gears 236A, 236B will exert an axial force pushing the driven double-helical gears 238A, 238B axially relative to the driving double-helical gears 236A, 236B. Simultaneously, the left-hand helix 244 of the driving double-helical gears 236A, 236B will exert a substantially equal axial force pushing the driven double-helical gears 238A, 238B axially relative to the driving double-helical gears 236A, 236B, but in the opposite direction. These axial forces will substantially cancel each other, resulting in very little or no axial loading on the first and second double-helical gear pairs 235A, 235B.

Due to manufacturing processes, all gears inherently have imperfections. By allowing the driving and driven double-helical gears 236A, 236B, 238A, 238B to self-center, the double-helical gearset 216 establishes the center line of engagement between the driving and driven double-helical gears 236A, 236B, 238A, 238B. This allows the double-helical gears 236A, 236B, 238A, 238B to naturally find their best line of engagement, reducing undue wear and NVH issues.

To allow the driving and driven double-helical gears 236A, 236B, 238A, 238B to find their own center, only one of the driving double-helical gear 236A mounted onto the transfer shaft 224 of the electric motor 212, the layshaft 270 and the driven double-helical gear 238B mounted onto the housing 240 of the differential assembly 214 is axially fixed. At least two of the driving double-helical gear 236A mounted onto the transfer shaft 224 of the electric motor 212, the layshaft 270 and the driven double-helical gear 238B mounted onto the housing 240 of the differential assembly 214 must be axially floating.

Referring again to FIG. 5A, the electric motor 212 and the transfer shaft 224 are supported by basic roller bearings 258 that provide radial support and allow rotation, but do not provide axial support, thereby allowing the electric motor 212 and the transfer shaft 224 to move axially. The differential assembly 214 is also supported by basic roller bearings 258 that provide radial support and allow rotation, but do not provide axial support, thereby allowing the differential assembly 214 to move axially. The layshaft 270 is supported by axial roller bearings 260 that provide axial support to the layshaft 270 and keep the layshaft 270 from moving axially.

The electric motor 212, the transfer shaft 224 and the differential assembly 214 are axially floating, and allowed to move axially. The driving double-helical gear 236A of the first double-helical gear pair 235A is free to self-center relative to the driven double-helical gear 238A of the first double-helical gear pair 235A. The driven double-helical gear 238B of the second double gear pair 235B is free to self-center relative to the driving double-helical gear 236B of the second double-helical gear pair 235B.

Figure 5B:
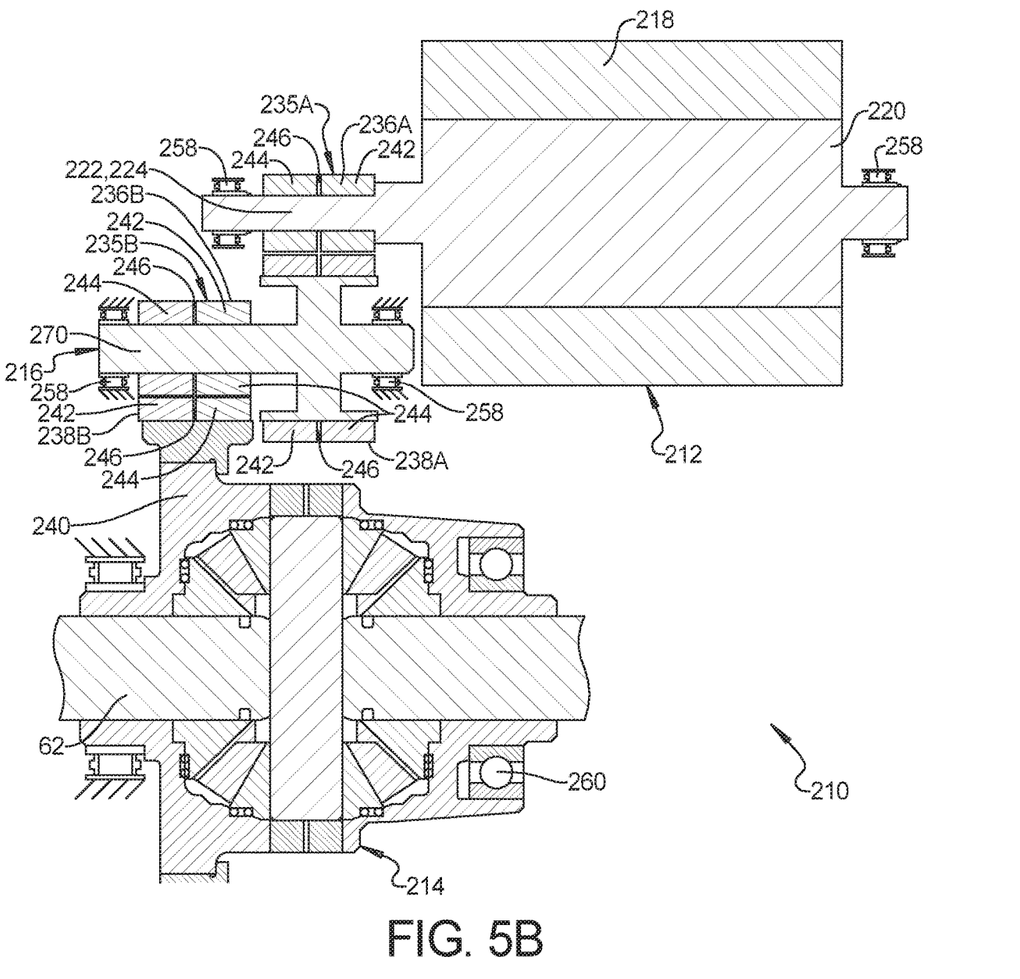
FIG. 5B is a side sectional view of an electric drive unit according to another exemplary embodiment.

Referring to FIG. 5B, alternatively, the electric motor 212 and the transfer shaft 224 are supported by basic roller bearings 258 that provide radial support and allow rotation, but do not provide axial support, thereby allowing the electric motor 212 and the transfer shaft 224 to move axially. The layshaft 270 is also supported by basic roller bearings 258 that provide radial support and allow rotation, but do not provide axial support, thereby allowing the layshaft 270 to move axially. The differential assembly 214 is supported by axial roller bearings 260. Axial roller bearings 260 are ball bearings that provide both radial and axial support to the differential assembly 214 and keep the differential assembly 214 from moving axially.

The electric motor 212, the transfer shaft 224 and the layshaft 270 are axially floating, and allowed to move axially. The driving double-helical gear 236B of the second double-helical gear pair 235B is free to self-center relative to the driven double-helical gear 238B of the second double-helical gear pair 235B, and the driving double-helical gear 236A of the first double-helical gear pair 235A is free to self-center relative to the driven double-helical gear 238A of the first double-helical gear pair 235A.

Figure 6:
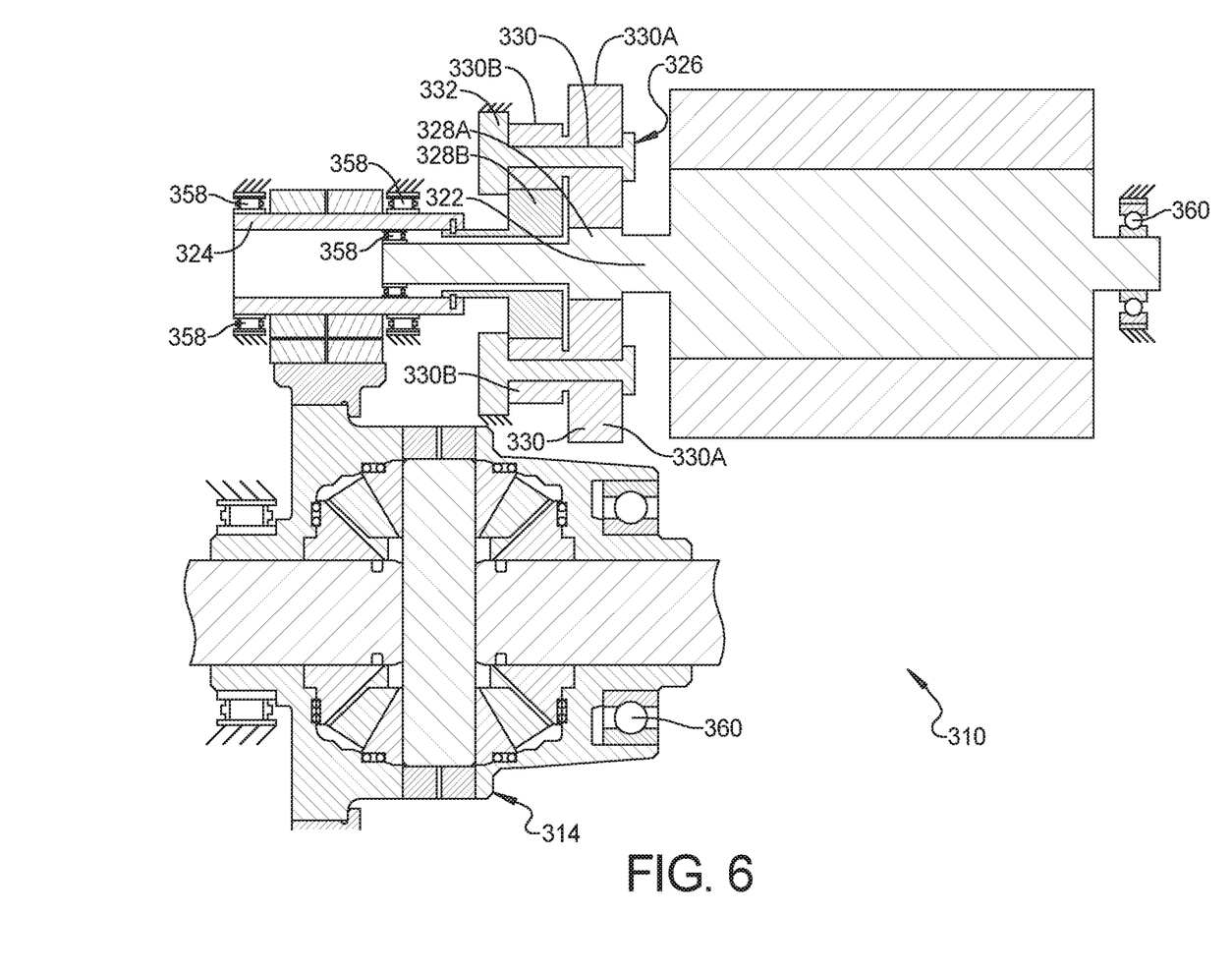
FIG. 6 is a side sectional view of an electric drive unit according to another exemplary embodiment.

Referring to FIG. 6, in a variation of the electric drive unit 10 shown in FIG. 1, an electric drive unit 310 includes a planetary gearset 326 that is positioned between and interconnecting the rotor shaft 322 to the transfer shaft 324. The planetary gearset 326 is a ring-less stepped-pinion planetary gearset that includes a first sun gear 328A, a second sun gear 328B, a carrier 332, and a plurality of stepped pinion gears 330. Each of the stepped pinion gears 330 includes a first section 330A in engagement with the first sun gear 328A and a second section 330B in engagement with the second sun gear 328B. The first sun gear 328A is mounted onto or integrally formed with the rotor shaft 322. The second sun gear 328B is rotationally interconnected to the transfer shaft 324. The carrier 332 is rotationally fixed to structure of the electric drive unit 310.

The first section 330A of each of the plurality of pinion gears 330 has a number of teeth different than the second section 330B of each of the plurality of pinion gears 330, such that the planetary gear set 326 provides a gear reduction to reduce the rotational speed of the transfer shaft 324 from the rotational speed of the rotor shaft 322.

Referring again to FIG. 6, as shown, the transfer shaft 324 is supported by basic roller bearings 358 that provide radial support and allow rotation, but do not provide axial support, thereby allowing the transfer shaft 324 to move axially. The differential assembly 314 is supported by axial roller bearings 360 that provide axial support to the differential assembly 314. Alternatively, the transfer shaft 324 is supported by axial roller bearings 360 that provide radial support and allow rotation, and also provide axial support. The differential assembly 314 is supported by basic roller bearings 358 that provide axial support and allow rotation, but do not provide axial support.

Figure 7:
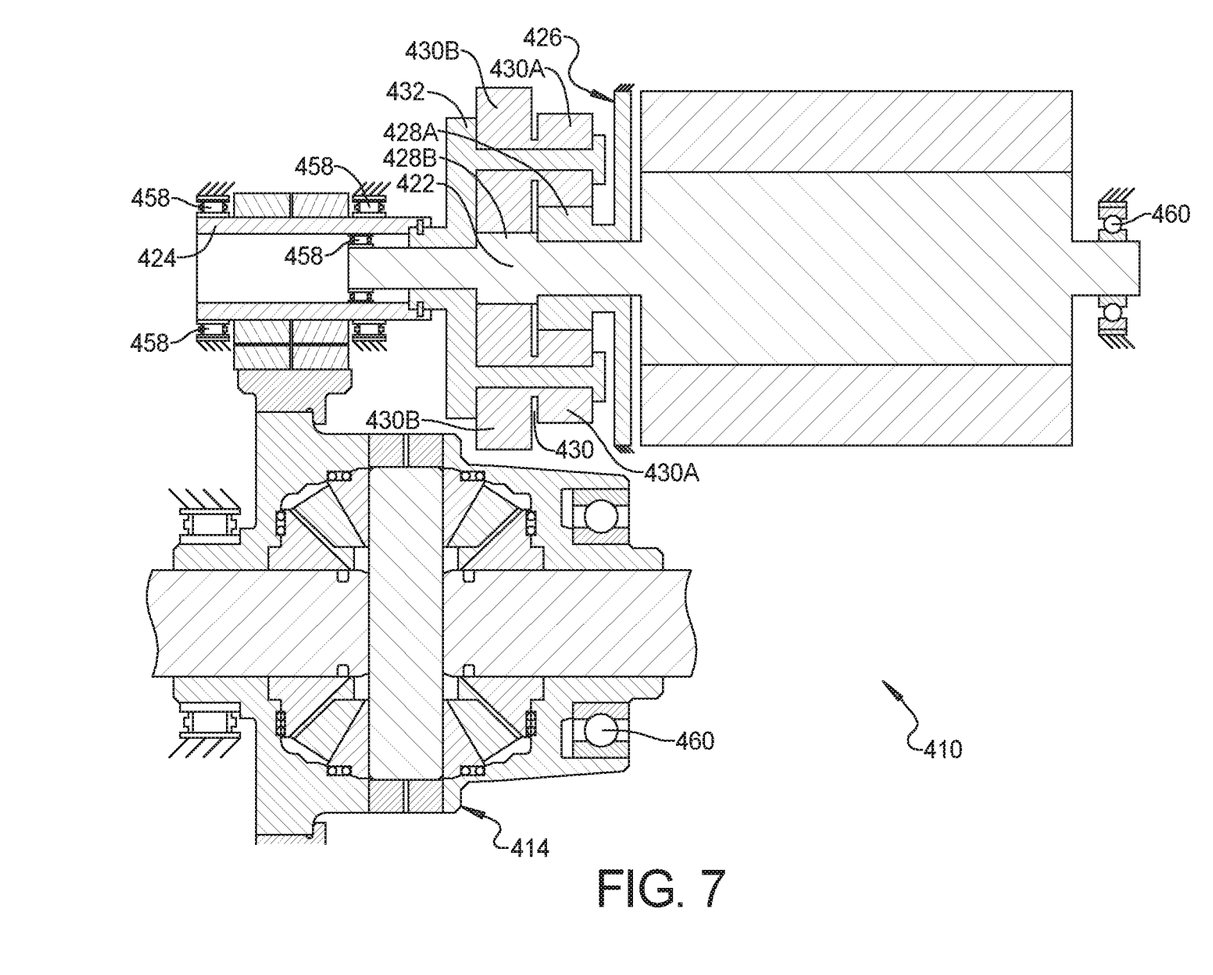
FIG. 7 is a side sectional view of an electric drive unit according to another exemplary embodiment.

Referring to FIG. 7, in a variation of the electric drive unit 10 shown in FIG. 1, an electric drive unit 410 includes a planetary gearset 426 that is positioned between and interconnecting the rotor shaft 422 to the transfer shaft 424. The planetary gearset 426 is a ring-less stepped-pinion planetary gear-set that includes a first sun gear 428A, a second sun gear 428B, a carrier 432, and a plurality of stepped pinion gears 430. Each of the stepped pinion gears 430 includes a first section 430A in engagement with the first sun gear 428A and a second section 430B in engagement with the second sun gear 428B. The second sun gear 428B is mounted onto or integrally formed with the rotor shaft 422. The first sun gear 428A is rotationally fixed to structure of the electric drive unit 410. The carrier 432 is rotationally interconnected to the transfer shaft 424.

The first section 430A of each of the plurality of pinion gears 430 has a number of teeth different than the second section 430B of each of the plurality of pinion gears 430, such that the planetary gearset 426 provides a gear reduction to reduce the rotational speed of the transfer shaft 424 from the rotational speed of the rotor shaft 422.

Referring again to FIG. 7, as shown, the transfer shaft 424 is supported by basic roller bearings 458 that provide radial support and allow rotation, but do not provide axial support, thereby allowing the transfer shaft 424 to move axially relative to the differential assembly 414. The differential assembly is supported by axial roller bearings 460 that provide axial support to the differential assembly 414. Alternatively, the transfer shaft 424 is supported by axial roller bearings 460 that provide radial support and allow rotation, and also provide axial support. The differential assembly 414 is supported by basic roller bearings 458 that provide axial support and allow rotation, but do not provide axial support.

An electric drive unit according to the present disclosure offers several advantages. These include using double-helical gears to provide geared interconnections between components of the electric drive unit, and allowing certain components to axially float, thereby reducing or eliminating axial loads within the geared interconnections. Reduced axial loads allow the use of increased helix angles on the helical gearing, thereby reducing the involute contact ratio and reducing sliding within the gearsets while maintaining total contact ratio for durability and NVH. The use of nested bearings reduces the relative speed of at least one of the rotor bearings and can support axial loads to reduce the bearing losses within the electric drive unit. Further, the orientation of the double-helical gears can be selected to either provide a wedging through the oil within the electric drive unit, thereby reducing churn losses, or alternatively, to scoop the oil and provide pumping of the oil within the electric drive unit.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An electric drive unit, comprising:
    an electric motor, including a stator and a rotor;
    a differential assembly; and
    a double-helical gearset positioned between and interconnecting the electric motor and the differential assembly and adapted to transfer rotational motion from the electric motor to the differential assembly;
    wherein, the electric motor is adapted to allow axial movement of the rotor relative to the stator to allow self-centering of the double-helical gearset, and the axial position of the rotor relative to the stator is established by the double-helical gearset.

2. The electric drive unit of claim 1, wherein the electric motor includes a stator, a rotor and a rotor shaft all mounted co-axially with a transfer shaft and the double-helical gearset comprises, a planetary gearset interconnecting the rotor shaft and the transfer shaft to transfer rotational motion from the rotor shaft to the transfer shaft.

3. The electric drive unit of claim 2, wherein the planetary gearset includes a sun gear, a ring gear, a carrier and a plurality of pinion gears rotatably supported on the carrier, further wherein each of the sun gear, the ring gear and the plurality of pinion gears is a double-helical gear.

4. The electric drive unit of claim 1, wherein the double-helical gearset includes a layshaft, a first double-helical gear pair adapted to transfer rotational motion from the electric motor to the layshaft and a second double-helical gear pair adapted to transfer rotational motion from the layshaft to the differential assembly.

5. The electric drive unit of claim 4, wherein the first double-helical gear pair includes a driving double-helical gear rotationally mounted onto a transfer shaft of the electric motor and a driven double-helical gear rotationally mounted onto the layshaft, and the second double-helical gear pair includes a driving double-helical gear rotationally mounted onto the layshaft and a driven double helical gear rotationally mounted onto a housing of the differential assembly.

6. The electric drive unit of claim 5, wherein each of the driving double-helical gears includes a right-hand helix, a left-hand helix and a gap extending circumferentially around the driving double-helical gear between the right-hand helix and the left-hand helix, and each of the driven double-helical gears includes a right-hand helix, a left-hand helix and a gap extending circumferentially around the driven double-helical gear between the right-hand helix and the left-hand helix.

7. The electric drive unit of claim 6, wherein one of the driving double-helical gears and the driven double-helical gears includes a park gear positioned within the gap between the right-hand helix and the left-hand helix.

8. The electric drive unit of claim 6, wherein only one of the driving double-helical gear mounted onto the transfer shaft of the electric motor, the layshaft and the driven double-helical gear mounted onto the housing of the differential assembly is axially fixed relative to the electric motor and the differential assembly.

9. An electric drive unit, comprising:
    an electric motor;
    a differential assembly; and
    a double-helical gearset positioned between and interconnecting the electric motor and the differential assembly and adapted to transfer rotational motion from the electric motor to the differential assembly, wherein the double-helical gear set includes a driving double-helical gear rotationally mounted onto a transfer shaft of the electric motor, the driving double-helical gear including a right-hand helix, a left-hand helix and a gap extending circumferentially around the driving double-helical gear between the right-hand helix and the left-hand helix, and a driven double-helical gear rotationally mounted onto a housing of the differential assembly, the driven double-helical gear including a right-hand helix, a left-hand helix and a gap extending circumferentially around the driven double-helical gear between the right-hand helix and the left-hand helix, the driving double-helical gear in rotational engagement with the driven double-helical gear, one of the driving double-helical gear and the driven double-helical gear including a park gear positioned within the gap between the right-hand helix and the left-hand helix.

10. The electric drive unit of claim 9, wherein one of the driving double-helical gear and the driven double-helical gear is axially moveable relative to the other one of the driving double-helical gear and the driven double-helical gear.

11. The electric drive unit of claim 10, wherein the electric motor includes a stator, a rotor, a rotor shaft and a planetary gearset all mounted co-axially with the transfer shaft, the planetary gearset interconnecting the rotor shaft and the transfer shaft to transfer rotational motion from the rotor shaft to the transfer shaft.

12. The electric drive unit of claim 11, wherein the rotor shaft is rotatably supported on the transfer shaft by a radially nested bearing.

13. The electric drive unit of claim 11, wherein the planetary gearset includes a sun gear, a ring gear, a carrier and a plurality of pinion gears rotatably supported on the carrier, each of the sun gear, the ring gear and the plurality of pinion gears is a double-helical gear.

14. The electric drive unit of claim 11, wherein the planetary gearset is a ring-less stepped-pinion planetary gearset.

15. The electric drive unit of claim 14, wherein the planetary gearset includes a first sun gear, a second sun gear, a carrier, and a plurality of stepped pinion gears.

16. An electric drive unit, comprising:
    an electric motor;
    a differential assembly; and
    a double-helical gearset positioned between and interconnecting the electric motor and the differential assembly and adapted to transfer rotational motion from the electric motor to the differential assembly, the double-helical gearset including:
        a driving double-helical gear rotationally mounted onto a transfer shaft of the electric motor and including a right-hand helix, a left-hand helix and a gap extending circumferentially around the driving double-helical gear between the right-hand helix and the left-hand helix, a driven double-helical gear rotationally mounted onto a housing of the differential assembly and including a right-hand helix, a left-hand helix and a gap extending circumferentially around the driven double-helical gear between the right-hand helix and the left-hand helix, and a park gear positioned within the gap between the right hand helix and the left hand helix of one of the driving double-helical gear and the driven double-helical gear, wherein one of the driving double-helical gear and the driven double-helical gear is axially moveable.

17. The electric drive unit of claim 16, wherein the electric motor includes a stator, a rotor, a rotor shaft and a planetary gearset all mounted co-axially with the transfer shaft, the planetary gearset interconnecting the rotor shaft and the transfer shaft to transfer rotational motion from the rotor shaft to the transfer shaft.

* * * * *